United States Patent
Roch et al.

(10) Patent No.: US 7,782,879 B2
(45) Date of Patent: Aug. 24, 2010

(54) METHOD AND SYSTEM FOR MULTI-LAYER SIGNALING ACROSS MULTIPLE CONTROL NETWORKS

(75) Inventors: Evelyne Roch, Pontiac (CA); Stephen Shew, Kanata (CA)

(73) Assignee: Ciena Corporation, Linthicum, MD (US)

( * ) Notice: Subject to any disclaimer, the term of this patent is extended or adjusted under 35 U.S.C. 154(b) by 1090 days.

(21) Appl. No.: 11/428,098

(22) Filed: Jun. 30, 2006

(65) Prior Publication Data

US 2007/0230505 A1 Oct. 4, 2007

Related U.S. Application Data

(60) Provisional application No. 60/787,234, filed on Mar. 30, 2006.

(51) Int. Cl.
*H04L 12/28* (2006.01)
*H04L 12/56* (2006.01)
*H04J 3/12* (2006.01)
*H04J 3/16* (2006.01)
*H04J 3/22* (2006.01)

(52) U.S. Cl. .............. 370/401; 370/465; 370/469; 370/522

(58) Field of Classification Search ........ 370/384, 370/385, 401, 467, 466, 469, 522
See application file for complete search history.

(56) References Cited

U.S. PATENT DOCUMENTS

| | | | |
|---|---|---|---|
| 5,570,084 A | 10/1996 | Ritter et al. | |
| 6,999,998 B2 | 2/2006 | Russell | |
| 7,477,843 B1 * | 1/2009 | Peeters et al. | 398/57 |
| 2004/0114924 A1 * | 6/2004 | Holness et al. | 398/33 |
| 2005/0074029 A1 * | 4/2005 | Shew et al. | 370/469 |
| 2008/0310417 A1 * | 12/2008 | Friskney et al. | 370/392 |

FOREIGN PATENT DOCUMENTS

CA 2244564 6/1999

OTHER PUBLICATIONS

Optical Internet Working Forum contribution oif2004.477.05, "OIF UNI 2.0 Ethernet Architectural Discussion", Jan. 17, 2006, pp. 1-18.
ITU-T Recommendation G.8080/Y.1304 (2006), "Draft Revised Recommendation G.8080/Y.1304 (for consent)", Geneva, Feb. 6-17, 2006.
Optical Internetworking Forum contribution oif2005.088.07, "OIF Supercomm 2005 Demo Control Place Protocal Specification", Oct. 18, 2005.
Optical Internet Working Forum contribution oif2006.105.00, "Interlayer Architecture for UNI 2.0 and ENNI 2.0", May 2006.

* cited by examiner

*Primary Examiner*—Chi H Pham
*Assistant Examiner*—Farah Faroul
(74) *Attorney, Agent, or Firm*—Christopher & Weisberg, P.A.

(57) ABSTRACT

An aspect of the present invention provides a method of establishing call controller communication in a multi-layer transport network where a plurality of signaling communications networks may exist within each layer. An interlayer call controller association is enhanced to provide associations of multiple client call controllers to a single server layer call controller. A method of collecting sets of associations related to a single server layer call is provided so that a sequence of client call controllers may be constituted. The plurality of signaling communications networks is then used to pass control information between call controllers in that sequence.

20 Claims, 3 Drawing Sheets

SCN multiple mappings and loops

Figure 1

Figure 2: Interlayer NCC interaction during call setup

Figure 3 – SCN multiple mappings and loops

METHOD AND SYSTEM FOR MULTI-LAYER SIGNALING ACROSS MULTIPLE CONTROL NETWORKS

CROSS REFERENCE TO RELATED APPLICATIONS

This application claims the benefit of priority of U.S. Provisional Patent Application No. 60/787,234 filed Mar. 30, 2006, which is incorporated herein by reference.

FIELD OF THE INVENTION

The present invention relates generally to communication networks. More particularly, the present invention relates to call control in communication networks with multiple layers.

BACKGROUND OF THE INVENTION

For ease of reference, we begin with a list of abbreviations which will be used throughout this specification:
SCN—Signaling Control Network
NCC—Network Call Controller
NCCG—Network Call Controller Gateway
CC—Connection Controller
CCC—Client Call Controller
UNI—User to Network Interface
E-NNI—External Network to Network Interface
SNPP—Subnetwork Point Pool
OIF—Optical Internetworking Forum Modern communication networks are characterized by a large number of interconnected networks each of which may implement any one or more of a variety of transport protocols (e.g. Ethernet, ATM, TCP/IP; SONET/SDH). Where interconnected networks employ different transport protocols, adaptation services provided by the gateway servers facilitate transport of client data between the involved networks. In response to the demand for seamless communications across this "network of networks", much effort has been made to develop generic connection management schemes that can be utilized by network service providers independently of the transport technology used. This work has resulted in the International Telecommunications Union (ITU) standard Recommendation G.805, which defines a layered functional architecture for transport networks. The transport (bearer) plane has an architecture described in G.805—which involves transport layers, e.g. VC 4, STM-1 layer, etc. G.805 discusses how layers relate by multiplexing one layer into another (E.g., multiplexing multiple DS0s into a DS1, or according to the SDH or SONET hierarchy), in a process called adaptation. Two related transport plane layers are related (i.e., one is adapted into another) in a client-server relationship (e.g., 28×64 kb voice DS0 layers are multiplexed into a DS1). Such a relationship is recursive in nature as a first layer can be adapted into a second layer which in turn can be adapted into a third layer, etc.

Typically each protocol exists at a different layer. Furthermore, different business entities exist, and each may use different layers as well. Typically a control plane is associated with each transport (bearer) plane. Based on the G.805 layer architecture two models have been developed: G.8080 for the control plane (Automatically Switched Optical Network—ASON); and Tele-Management Forum (TMF) model TMF608 for the management plane. TMF814 is an interface specification of TMF that instantiates the TMF608 model. G.8080 defines two types of call controllers: calling/called party call controllers (CCCs); and network call controllers (NCCs). Calling/called party call controllers initiate and terminate calls, whereas network call controllers interact with the CCCs and with connection controllers to manage connections within the network. Within the management plane, TMF814 provides an interface that uses the G.805 model of connections. The relationship between connections at different layers is known in the TMF814 interface. Thus it can be used to manage multi-layer connections across the network.

Carrier transport networks typically use a Signaling Control Network (SCN) to allow call controllers to talk to each other. An SCN is typically a separate network from the transport plane and is used to allow NCCs to communicate. This is often used for control plane signaling, or to allow management functions from existing SONET networks, which do not have control planes, to interact with NEs.

Typically each carrier uses its own SCN and each layer may use separate SCNs. Furthermore, even within a single carrier, there may be different divisions which control particular services, which each operate with some level of autonomy. This can lead to different domains within a single carrier, and consequently multiple SCNs within a single layer. Note that more than one carrier may be co-located due to access requirements and corresponding regulations, which can also produce multiple SCNs within a layer.

A limitation of Recommendation G.8080/Y.1304 [2] (that is, the "Architecture of the Automatically Switched Optical Network"—ASON) was that it was defined for a single-layered control plane. Recently, there have been proposed improvements to rectify this limitation in the Recommendation. This improvement added the capability for inter layer calls which preserves independence between control planes per layer. In addition, a proposal for a call control using a layered call model is described in United States Patent Application 20050074029, "Call control using a layered call model", Apr. 7, 2005, which is assigned to the assignee of the present application, and which is hereby incorporated by reference.

There are two ways to achieve signaling in a multi-layer context. The first solution consists of embedding the first layer signaling in the second layer signaling. This leads to additional signaling on the server layer and the SCN at the server layer may need to be designed to support additional control traffic. In order to be recursive, a layer may need to carry embedded client layer information that may in turn carry embedded client layer information for the layer above. Since there is no bound on the number of layers, it may be difficult to design an SCN that will satisfy the requirements recursively.

The second solution consists of performing independent signaling at each layer, as discussed in Optical Internetworking Forum contribution (OIF) 2005.088.07, "OIF Supercomm 2005 Demo Control Plane Protocol Specification", October 2005 (hereafter referred to as the OIF 2005 demo), which is hereby incorporated by reference. For the demo, a single SCN was assumed to provide signaling connectivity between any call controller pair, regardless of layer. The solution used for the OIF 2005 demo consisted of signaling client layer SCN information at the server layer, allowing the client layer to setup a signaling adjacency and perform signaling directly at the client layer.

There are problems with the approach used in OIF 2005 demo described above. It does not work when two client layer NCCs are on separate SCNs as they don't have visibility of one another and don't know how to reach the other NCC. It also does not accommodate the scenario where there are control channel boundaries in the client layer that arise due to multiple SCNs in the client layer itself between the source and destination call controllers.

Scenarios where different layers have different SCNs are described in Optical Internetworking Forum contribution 2006.105.00, "Interlayer Architecture for UNI 2.0 and ENNI 2.0", May 2006, which is hereby incorporated by reference. However, no solution is provided for allowing the client layer NCCs to communicate across multiple SCNs.

It is, therefore, desirable to provide a way for a call that is originated at one layer, to use the resources of another layer to complete the call, when multiple SCNs exist between the call end points.

SUMMARY OF THE INVENTION

Aspects of the invention provide a method and system to setup a call in a multi-layer network using the interlayer aspect of the ASON architecture where there is a plurality of SCNs between domains within a layer and between layers. Aspects of the invention enables an inter layer call to allow a client call to be transmitted at a server layer, even if there are multiple SCNs. Even though transmission occurs at the server layer, the network still needs a signaling path for control information at the client layer. To over come the problem of NCCs on different SCNs being unaware of each other, we introduce a mechanism which permits the client layer to discover the signaling path between the NCCs on different SCNs.

To do this, we form associations between pairs of NCCs where the first NCC of the pair is in a client layer and the second is in a server layer to that client layer. Each NCC is typically at an SCN boundary. Such an association provides an NCC in one layer with knowledge of the paired NCC in the other layer. Such an association can also provide knowledge of horizontal network call controller relationships (i.e., NCCs with the ability to communicate with a paired NCC). For example, a client NCC X, which is associated with a server NCC Z, can also provide NCC Z with knowledge of client NCC Y which has a signaling link with NCC X. Thus the system determines the intermediate NCCs needed for a signaling path between end nodes of a client layer.

It should be noted that the system can be recursive, as there can be multiple layers, with one layer acting as a server layer to a client layer above it, and also acting as a client layer to a server layer below it.

An aspect of the invention provides a mechanism for determining the relay functions between the control entities at a client layer by its server layer. In other words, a call completed at a server layer gathers information about the corresponding control entities at the client layer, and returns this information to the client layer, which can then determine the routing between the necessary control entities at the client layer. Thus an ordered list of first layer network controllers is generated at a second layer by using information about intermediate first layer network call controllers provided by associations of pairs of first and second layer network call controllers. This ordered list is then communicated to a first layer network controller, thus identifying a first layer signaling path.

Accordingly an aspect of the invention provides a method of call set up between first and second network call controllers in a first layer comprising: a) Establishing a call between said first and second network call controllers via a plurality of network call controllers in a second layer; and b) Generating an ordered list of network call controllers in said first layer which provide a signaling path between said first and second network controllers. According to one aspect, this second step can include i) Generating an ordered list of first layer network call controllers at said second layer in response to said establishing step; and ii) Communicating said ordered list to aid first network call controller for establishing signaling between said first and second network call controllers in said first layer. This may be particularly beneficial when hops in said signaling path can cross different signaling control networks (SCNs).

According to further aspects of the invention, successive network call controllers at the boundary of SCNs form sets of network call controllers and wherein sets of network call controllers in a first layer are associated with boundary network call controllers in said second layer. These sets of network call controllers in the first layer form the constituents of said ordered list. According to a further aspect, the step of establishing the call comprises establishing call segments between successive network call controllers in the second layer, and the step of generating the ordered list comprises adding a set of network call controllers in said first layer to said ordered list for each call segment spanning a mapped boundary network call controller in said second layer.

A further aspect provides a computer program product containing computer instructions stored in a machine readable medium, which when executed by a processor, instructs a network to set up between first and second network call controllers in a first layer comprising: a) instructions for establishing a call between said first and second network call controllers via a plurality of network call controllers in a second layer; b) instructions for generating an ordered list of network call controllers in said first layer which provide a signaling path between said first and second network controllers which include: i) instructions for generating an ordered list of first layer network call controllers at said second layer in response to said establishing step; and ii) instructions for communicating said ordered list to aid first network call controller for establishing signaling between said first and second network call controllers in said first layer. As is known, the control plane can be distributed. Accordingly, it should be appreciated that such instructions can be executed on more than one processor.

Another aspect of the invention includes a network of nodes operable to execute such instructions.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for making a multilayered call in a network that includes a plurality of subnetworks.

In the following description, for purposes of explanation, numerous details are set forth in order to provide a thorough understanding of the present invention. However, it will be apparent to one skilled in the art that these specific details are not required in order to practice the present invention. For example, specific details are not provided as to whether the embodiments of the invention described herein are implemented as a software routine, hardware circuit, firmware, or a combination thereof.

Embodiments of the invention may be represented as a software product stored in a machine-readable medium (also referred to as a computer-readable medium, a processor-readable medium, or a computer usable medium having a computer readable program code embodied therein). The machine-readable medium may be any suitable tangible medium, including magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data, which, when executed, cause a processor to perform steps in a method according to an embodiment of the invention. Those of ordinary skill in the art will appreciate that other instructions and operations necessary to implement the described invention may also be stored on the machine-readable medium. Software running from the machine readable medium may interface with circuitry to perform the described tasks.

Embodiments of the present invention will now be described, in relation to an OIF based solution, by way of example only.

Figure 1:
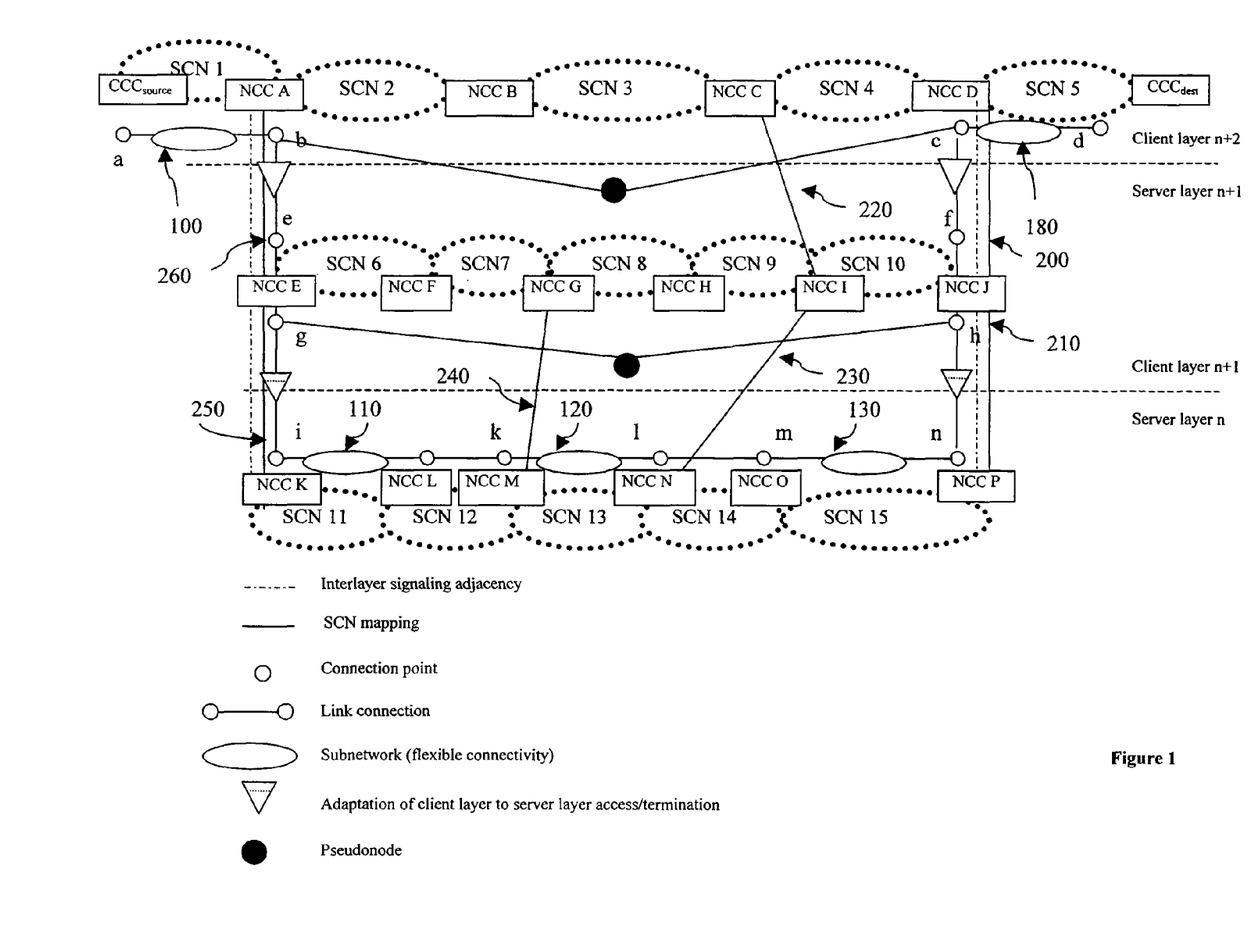
FIG. 1 is a schematic drawing which provides an example network.

FIG. 1 provides an example network that will be used as a reference model for illustrating the solution. It shows a multi-layer network where there are multiple SCNs per layer. The SCN boundaries could correspond to ASON domains, for example. Three layers are shown but there are no theoretical limits on the number of layers the network could support. In this example, we use the convention that layer n acts as a server layer to client layers above it. Thus, in this 3 layer example, the top layer (which is the layer which wishes to initiate a call) is layer n+2.

FIG. 1 shows transport constructs including a subnetwork and access point which is adapted into a server layer, which is further adapted into another server layer. FIG. 1 also shows corresponding control plane constructs, CCCs and NCCs, which are related to signaling. So in FIG. 1, the CCCs and NCCs boxes at the top of the figure are control plane constructs for that client layer.

Note FIG. 1 illustrates the mechanisms and functions needed to illustrate the example, without explicitly showing the nodes themselves. However it should be appreciated to a person skilled in the art that the functions are carried out by various nodes in the network. It should be noted that there does not need to be a 1-to-1 correspondence between functions (e.g., NCC) and nodes, as a node can perform more than one function, and certain functions can be distributed. Thus the circles and squares are not necessarily nodes. A Node is the location where a collection of functions exist. So each construct represents an entity executed by a processor—which can be at different location than as shown. From a routing perspective, each layer possesses knowledge of the resources, for example, subnetworks, links and pseudo-nodes, to complete a connection. Layer n+2 is aware of the resources between b and c that enable a path between $CCC_{source}$ and $CCC_{dest}$. These resources are provided by a server layer that is layer n+1. Similarly, layer n+1 views resources between e and f that enable a path between them.

As can be seen, the top layer, client layer n+2 comprises a source $CCC_{source}$ associated with access point a, and a destination client $CCC_{dest}$ associated with access point d. The top layer also comprises network call controllers NCC-A and NCC-D and a few Network Call Controller Gateways (NCCG), NCCG-B and NCCG-C, and signaling networks SCN 1-SCN 5. An NCCG is a function that performs forwarding of call related signaling messages without interactions with a subnetwork. It should be understood that NCCG-B and NCCG-C can be full NCCs. However, as there is no bearer plane, the full functionality of an NCC is not required, as typically only signaling (control information) needs to be passed between NCCGs. We therefore introduce a reduced function NCC, which we identify as an NCCG. In this specification, the term NCC includes both a full function (conventional) NCC, and a reduced function NCC (NCCG).

The top layer also includes a subnetwork 100 transporting data flow between connection point a and connection point b, and a subnetwork 180 transporting data flow between connection point c and connection point d.

The middle layer acts as the server layer (n+1) to the top layer (client layer n+2) and as the client layer (n+1) to the bottom server layer n. FIG. 1 does not illustrate any subnetworks in the middle layer, as none are required. The middle layer comprises network call controllers NCC-E, NCCG-F, NCCG-G, NCCG-H, NCCG-I and NCC-J, and associated signaling networks SCN 6-SCN 10.

The bottom layer, server layer n, includes connection points g, h, i, j, k and l. Subnetworks 110, 120 and 130 allow communication between connection points g and h, i and j and k and l respectively. Link connections allow communication between j and k and between h and i. The bottom layer also comprises network call controllers NCC-K, NCC-M, NCC-N, NCC-O, and NCC-P, and signaling networks SCN 11-SCN 15.

In this example, access point a desires to make a call to access point d but the CC domains do not have actual resources at layer n+2 to do so other than subnetworks 100 and 180. However, the call controllers on their boundaries are aware that a server layer can provide a connection over which a layer n+2 connection can be mapped. This awareness could be provided by a representation of the server layer connectivity by a pseudo node to the routing function at layer n+2. This representation is described in Optical Internetworking Forum contribution 2006.105.00, "Interlayer Architecture for UNI 2.0 and ENNI 2.0", May 2006. Similarly, at layer n+1, the CC domains do not have actual resources, so the call uses the transport layer n, which does have the actual resources in that layer to complete the call. The routing function at each layer provides transport layer paths to access points and the pseudo node enables access points to be reported by routing as reachable when actual transport layer resources do not exist.

In the example shown in FIG. 1, as NCC A does not have resources at layer n+2 to complete the call from a to d, it requests a server layer NCC, in this case NCC E, to complete the call. Such a request is referred to as an inter layer call. In this example, as NCC E also does not have the necessary resources, it makes an inter layer call to NCC K in layer n. Layer n has the resources to complete the call, so NCC K commences a path to NCC P via each successive NCC (L, M, N, O).

As stated above, United States Patent Application 20050074029, "Call control using a layered call model", published on Apr. 7, 2005, describes a layered call model which enables such an interlayer call to NCC K, in a scenario that did not specify how control communication occurred over multiple SCNs.

However, in the example illustrated in FIG. 1, multiple SCNs exist (and in this example, at each layer). In this example, NCC E knows that e and f need to connect—but does not know how to reach NCC J, which is on a different SCN (where the addressing may be different). Furthermore, NCC A does not know how to reach NCC D, as NCC D is on different SCN.

Figure 2:
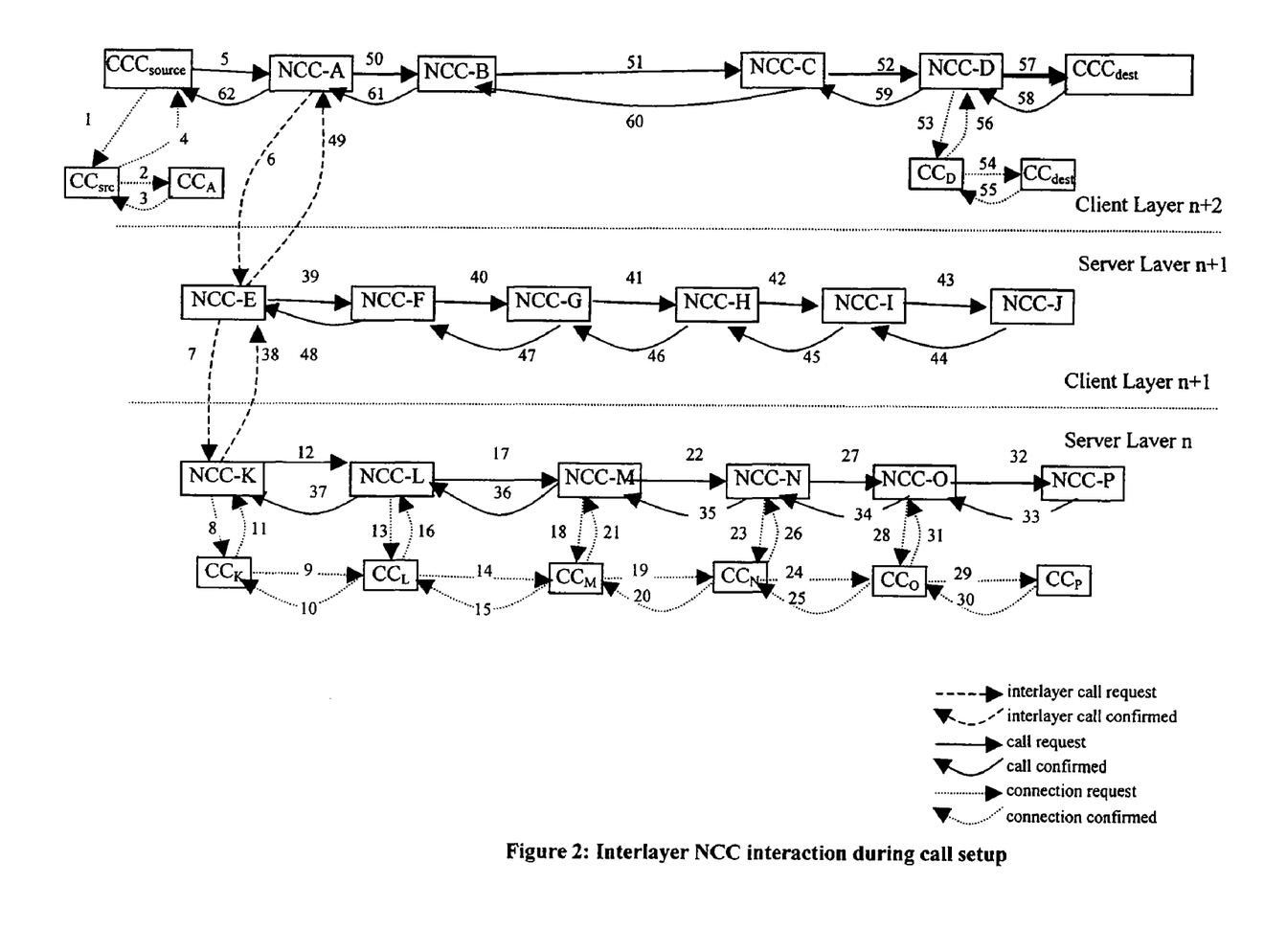
FIG. 2 illustrates a call sequence between the source and destination clients shown in FIG. 1, according to an embodiment of the invention.

FIGS. 1 and 2 illustrate an embodiment of the invention that enables an interlayer call to allow a client call to be transmitted at a server layer, even if there are multiple SCNs. Even though transmission occurs at the server layer, the network still needs a signaling path for control information at the client layer. To over come the problem of NCCs on different SCNs being unaware of each other, we introduce a mechanism which permits the client layer to discover the signaling path between the NCCs on different SCNs. We remind the reader that for the sake of simplicity, we use the term NCC to include conventional NCCs and reduced function NCCGs. In a simplified network, each NCC could be provisioned with knowledge of every other NCC. However, in complex real world networks, this could prove an onerous task for a network operator. We therefore propose a mechanism for determining intermediate NCCs needed for a signaling path between end nodes.

As stated above, to do this, we form associations between pairs of NCCs where the first NCC of the pair is in a client layer and the second is in a server layer to that client layer. Each NCC is typically at an SCN boundary. Such an association provides an NCC in one layer with knowledge of the paired NCC in the other layer. Such an association can also provide knowledge of horizontal network call controller relationships (i.e., NCCs with the ability to communicate with a paired NCC). For example, a client NCC X, which is associated with a server NCC Z, can also provide NCC Z with knowledge of client NCC Y which has a signaling link with NCC X.

Referring to the example shown in FIGS. 1 and 2, <NCCG-G, NCC-M> and <NCCG-I, NCC-N> form two such pairs. Then, the knowledge of intermediate NCCs (i.e., NCCs which do not belong to an associated pair) is provisioned in one or more of the server NCCs of the pairs. For example, on the server layer NCC-M and/or NCC-N, the following information needs to be entered: The following client layer NCCG-G can reach the following client layer NCCG-I through <NCCG-G, NCCG-H, NCCG-I>. Then, as the server layer call is established, the signalling process makes note of the intermediate NCCs via the provisioned knowledge. Thus, when the call is completed at the server layer—the signaling process has identified a corresponding sequence of NCCs and NCCGs in the client layer, which can be used for control plane signaling at that client layer.

Thus according to an embodiment of the invention, when server layer n completes connection from K to P, it has learned that the layer above needs to communicate through the ordered list of network call controllers NCC-E, NCCG-F, NCCG-G, NCCG-H, NCCG-I, and NCC-J. NCC K provides this generated ordered list to the NCC which made the inter layer call (NCC E), thus informing NCC E that it needs to traverse NCCs F, G, H, and I in order to get to NCC J.

NCC E accordingly establishes a signaling adjacency to NCC-J through NCCG-F, NCCG-G, NCCG-H and NCCG-I using the ordered list provided by NCC-K. In a similar fashion, as the adjacency between NCC-E and NCC-J is established, the system learns of the corresponding ordered list of call controllers needed in the layer above. Therefore when NCC-E replies to the interlayer call request from NCC-A, it communicates the generated ordered list of NCC-A, NCCG-B, NCCG-C, and NCC-D to the client layer above.

Accordingly, prior to signaling, NCCs at a server layer are configured with a set of ordered lists of NCCs that need to be used to cross SCN boundaries at a corresponding client layer. Each provisioned ordered list includes 0, 1 or more NCCs and is specified with respect to another NCC. For example, in FIG. 1, NCC J is provisioned with knowledge of NCC-D and this association is illustrated as mapping 200. In the example illustrated in FIG. 1, the <NCC-C, NCC-I> and <NCC-D, NCC-J> pairs are configured so that when signalling establishes the NCC-I to NCC-J signalling segment that crosses SCN-10, it becomes known that the sequence NCC-C and NCC-D, is needed in the corresponding client layer to support the interlayer call and this sequence will cross SCN-4. In addition NCC M is configured with a set of ordered list of client NCCs with respect to selected server NCCs K and N. The list for client layer n+1 for NCC K contains E-F-G (associations 250/240) and the list for client layer n+1 for NCC N contains G-H-I (associations 240/230).

FIG. 1 illustrates many potential relationships between the SCNs at two different layers. For example, it is possible that the SCN boundaries are aligned between two layers. This is the case of SCN 4 and SCN 10 where a 1:1 relationship is illustrated between line 220 linking NCCG C with NCCG I and line 200 linking NCC D and NCC J. It is also possible that there is one SCN at one layer and multiple SCNs at the other layer. This is the case of SCN 10 and SCNs 14-15 where we have a 1:N relationship, which is illustrated in FIG. 1 between the solid line 230 linking NCCG-I with NCC-N and line 210 linking NCC-J and NCC-P. FIG. 1 also illustrates the N:1 case, as can be seen with SCNs 8-9 and SCN 13, which is illustrated between line 240 linking NCCG-G and NCC-M and line 230 linking NCCG-I and NCC-N. The last case is when there are multiple SCNs at one layer mapping to multiple SCNs at another layer. For example 2 SCNs at the client layer (in FIG. 1, SCN 2 and 3) are associated with 4 SCNs at the server layer (in FIG. 1, SCN 6-9), as can be seen between lines 260, linking NCC-A to NCC-E, and 220, linking NCCG-C to NCCG-I.

Depending on how the network is provisioned, it is not necessary to have any of the intermediate SCN pairings provided there is a full association of intermediate client layer NCC/NCCGs provisioned at the edge pair of NCCs. For example, NCC-E and NCC-J could contain information about their respective pairs <NCC-A, NCC-E> and <NCC-D, NCC-J> and all intermediate NCC/NCCGs that need to be traversed at the client layer, i.e. NCC-A, NCCG-B, NCCG-C, NCC-D. As this requires all server layer NCCs to know the intermediate client layer NCC/NCCGs to all potential server layer NCCs, it is not easily scalable. Preferably the network is divided into a manageable number of server/client NCC associations that need to be mapped and for which intermediate NCC/NCCGs need to be provisioned.

Once the appropriate associations are provisioned, the layer n+1 knows that when attempting to connect from E to I, there is an SCN mapping that identifies the need to go through A, B, and C in the client layer above corresponding to the <NCC-A, NCC-E> pair (line 260) and <NCCG-C, NCC-I> pair (line 220). Similarly, both I and J know that C and D can communicate directly with each other.

As stated, we accomplish this by provisioning associations between pairs of NCCs in order to map horizontal call controller relationships in a client layer to one or more boundary network call controllers in the server layer. A boundary network controller is a NCC at the boundary of a SCN. More generally, in order to establish a client layer signaling path, successive network call controllers at the boundary of SCNs form sets of network call controllers in a first layer, which are associated with boundary network call controllers in said second layer. At least some of these associations between sets of network controllers in said first layer and boundary network controllers in said second layer are provisioned in advance. These associations can be provisioned in advance by appropriate mappings as shown or they can be established through a naming convention of the network call controllers across multiple layers.

An example of the call sequence between a source and destination client in layer n+2 is illustrated in FIG. 2. FIG. 2 illustrates the message flows according to an embodiment of the invention, for a call for the example illustrated in FIG. 1. Note FIG. 2 is similar to FIG. 1, but it also illustrates the Connection Controllers (CCsrc and $CC_A$ at the source and $CC_D$ and $CC_{dest}$ at the destination), and a numbered sequence of events for establishing an interlayer call, according to an embodiment of the invention.

At the top layer a call is initiated, and steps 1-3 execute a connection set up at the Sub network 100. As can be seen, NCC-A can not further complete the call (at the top layer) as there are no resources available at layer n+2 between connection points b and c. Therefore NCC-A makes an interlayer call (dotted line) 6 to NCC-E in a server layer (n+1). NCC-E subsequently realizes that it also can not complete the call in its layer as there are no resources available at layer n+1 between connection points e and f. Consequently NCC-E makes an interlayer call (dotted line) 7 to NCC-K in a server layer n.

The steps that occur in the bottom layer (n) represent, for the most part, a traditional call set-up, according to the protocol/standard of the lower layer. However, as the call set-up sequence progresses through NCCs K, L, M, N, 0, and P, the NCCs with the provisioned SCN mappings (K, M, N, and P) in addition gather the list of intermediate NCC/NCCGs between the various client/server NCC pairs. Thus, the lower layer determines the middle layer sequence of NCCs/NCCGs E, F, G, H, and I, and communicates this ordered set of NCCs/NCCGs to its client layer (n+1), as shown at step 38. In more generic terms, as the lower (server) layer establishes connections to complete the call at its layer, it generates an ordered list of network controllers at the layer above it (client layer) needed for signaling at that (client) layer.

Accordingly, NCC-E learns about the path needed to setup a signaling adjacency to NCC-J. It must go through NCC-F, G, H and I. NCC-E can setup a signaling adjacency in layer n+1 from NCC-E to NCC-J once the ordered list is communicated to NCC-E from the server layer.

Further more, in this 3 layer example, the system similarly determines the corresponding list of controllers in the top layer (n+2) as the sequence of NCCs/NCCGs NCC-E, NCC-F, NCC-G, NCC-H, NCC-I, NCC-J. is traversed in layer n+1. In other words layer n+1 uses a ordered list (passed to it from the layer below) to know how to traverse the signaling networks and at the same time, collects sufficient information to allow the client layer to traverse its signaling networks. The details of this example are explained below, according to an embodiment of the invention.

Call setup is initiated by $CCC_{source}$ and results in a link connection being established across the first subnetwork 100 in steps 1-4. After step 5 at NCC-A, address resolution returns an SNPP corresponding to the destination Transport Network Address (TNA) at the UNI to the destination client $CCC_{dest}$. This SNPP is learned from the Routing Controller that has the higher level view of the layer. Path computation returns a path that indicates that the destination SNPP is reachable through a pseudo-node.

The presence of the pseudo-node indicates that there are no client resources available for a connection, and that a server layer is needed. The interlayer address resolution function is called using the client layer SNPPs on either side of the links into the pseudo-node. Source and destination TNAs in the server layer (layer n+1 in FIG. 1) are returned, and a call is made to NCC-E with those TNAs in layer n+1 at step 6.

At this point, NCC-E determines whether a new call should be created or if an existing one can be used.

In the case of a new setup, at NCC-E, the source and destination TNAs in layer n+1 are resolved into SNPPs. Path computation returns a path that indicates the destination SNPP is reachable through a pseudo-node. The presence of the pseudo-node indicates that there are no resources available at that layer and a server layer is needed. The interlayer address resolution function is called using the layer n+1 SNPPs on either side of the links into the pseudo-node. Source and destination TNAs in the server layer n are returned and a call is made to NCC-K with those TNAs at step 7. Note that the procedures are recursive and NCC-E performs the exact same steps as NCC-A. Since the procedures are recursive, there is no bound on the number of adjacent layers.

In the case where NCC-E determines that an existing call can be used, it signals along the existing path (steps 39 to 48) in order to bind the requesting client layer n+2 to the server layer n+1 and retrieving the ordered list of call controllers to be used to cross the SCN boundaries at the client layer. In this case, steps 8 to 37 would have already been performed and layer n does not need to be involved again. Skip to step 49.

At this point, NCC-K determines whether a new call is setup or if an existing one can be used.

In the case of a new setup, regular call and connection control signaling takes place with an additional piece of information being collected during signaling (steps 8-37). In server layer n, the call controllers NCC-K, NCC-M, NCC-N and NCC-P record information about the client call controller to be used to cross SCN boundaries at the client layer. For example, NCC-K and NCC-M can record that NCC-G can be reached from NCC-E by going through NCC-F, based on a provisioned list of client layer intermediate NCCs between NCC-E and NCCG-F available at NCC-K and NCC-M for the following pairs <NCC-E, NCC-K> and <NCCG-G, NCC M>. In this example, the ordered list of client call controllers to traverse to cross client layer n+1 SCN boundaries consists of NCC-E, NCCG-F, NCCG-G, NCCG-H, NCCG-I, NCC-J.

In the case where NCC-K determines that an existing call can be used, it signals along the existing path of call controllers in order to bind the requesting client layer to the server layer and retrieve the ordered list of call controllers to be used to cross the E-NNI at the client layer SCN boundary (steps 12-37). Accordingly, when an existing call can be used, the step of Establishing a call between said first and second network call controllers via a plurality of network call controllers in a second layer can comprise re-using existing call segments of another call.

At the completion of the server layer call n, a pair of connection points (CPs) is handed back in step 38 together with an ordered list of NCCs to use to cross the SCNs at the client layer. The client/server adaptation is associated to these CPs. This effectively provides the connection corresponding to the call segment between NCC-K and NCC-P.

At NCC-E, the ordered list of NCCs is examined and the first NCC is removed from the ordered list and translated into an SCN identifier for NCCG-F. A call request is sent hop by hop. This lookup and translation of NCCs is performed at NCCG-F, NCCG-G, NCCG-H, NCCG-I and NCC-J and call confirmed messages are returned on the reverse direction. At each NCC traversed, the ordered list of client layer n+2 NCC is collected and recorded. For example, NCC-E or NCC-I record that the NCC-A can reach NCCG-C through NCC-B. The final ordered list of NCC looks like this: NCC-A, NCCG-B, NCCG-C, NCC-D.

Step 49: At the completion of the server layer call n+1, a pair of CPs is handed back in step 49 together with an ordered list of NCCs/NCCGs to use to cross the SCNs at the client layer. The client/server adaptation is associated to these CPs. This effectively provides the connection corresponding to the call segment between NCC-E and NCC-J.

At NCC-A, the ordered list of NCCs is examined and the first NCC is removed from the ordered list and translated into an SCN identifier for NCC-B. A call request is sent hop by hop. This lookup and translation of NCCs is also performed at NCC-C. At NCC-D, call and connection control signaling continues to $CCC_{dest}$ (steps 53-58). This is followed by call confirmed messages (steps 59-62) following the same signaling path in the reverse direction through NCC-C and NCC-B in order to finally reach NCC-A and $CCC_{source}$.

It should be noted that 3 layers were described in the example to demonstrate the recursive nature of the solution. However it should be noted that the solution is applicable for 2 layers and can be easily extended to multiple levels. Furthermore, although we have described the different layers as being different technologies in a client server relationship, this is not necessary. Embodiments of the invention can be applied to a "carrier's carrier" (e.g., one business/division of a carrier provides a service using the carrier's transport network (which may be run by a different business/division)). In this case, the first and second layers are from the same transport layer technology.

Figure 3:
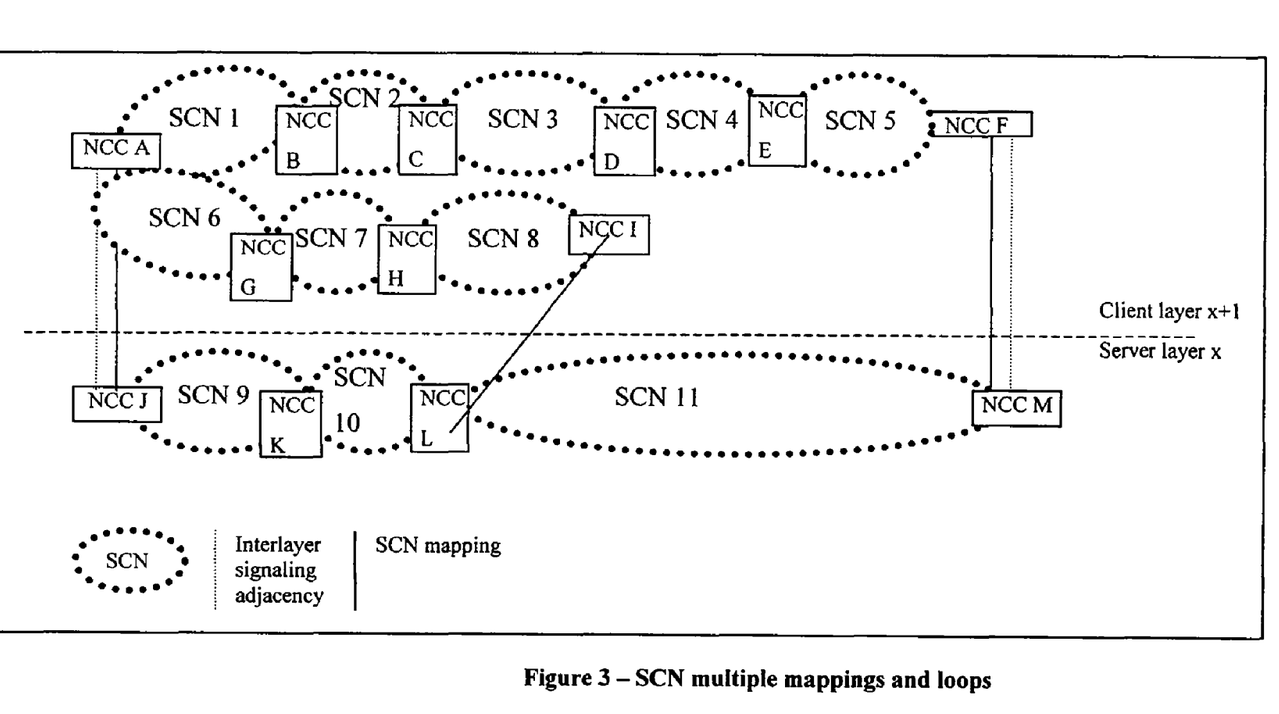
FIG. 3 illustrates an example case where a loop could be created and a way to optimize the method to remove repeated sections.

FIG. 3 illustrates an example case where a loop could be created, and a way to optimize the method to remove repeated sections. In this case, an association between NCCs J and L and NCCs A and I is provisioned on NCC Js and L together with an ordered list to reach NCC I from NCC A consisting of NCC G and NCC H. At NCCs J and M, an association to NCCs A and F is provisioned together with an ordered list to reach NCC F from NCC A consisting of NCC B, C, D and E. Finally, on NCCs L and M, an association to NCCs I and F is provisioned together with an ordered list to reach NCC F from NCC I consisting of NCCs I, H, G, A, B, C, D, E, F.

If a call is setup from NCC A to NCC F, according to the sequence described earlier, the NCC pair J and L will collect the ordered list of NCCs A-G-H-I and the NCC pair L and M will collect the following ordered list of NCCs I-H-G-A-B-C-D-E-F. The concatenated ordered list A-G-H-I-I-H-G-A-B-C-D-E-F contains a loop that can be eliminated by any NCC that has visibility to the loop to produce a loop free ordered list of A-B-C-D-E-F.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method of call set up between first and second network call controllers in a first layer comprising:
  a) Establishing a call between said first and second network call controllers via a plurality of network call controllers in a second layer; and
  b) Generating an ordered list of network call controllers in said first layer which provide a signaling path between said first and second network controllers;
  wherein step (b) comprises:
    i) Generating an ordered list of first layer network call controllers at said second layer in response to said establishing step; and
    ii) Communicating said ordered list to aid first network call controller for establishing signaling between said first and second network call controllers in said first layer;
  wherein hops in said signaling path can cross different signaling control networks (SCNs) and wherein said ordered list of network call controllers in said first layer are associated with said plurality of network call controllers in said second layer by means of associations between at least 2 pairs of call controllers, where each pair consists of a call controller from the first layer and one from the second layer.

2. The method as claimed in claim 1 wherein said at least 2 pairs of call controllers include said first and second network call controllers, and wherein at least some of said associations are provisioned in advance.

3. The method as claimed in claim 2, wherein the second layer is a server layer to the first layer.

4. The method as claimed in claim 2, wherein the first and second layers are from the same transport layer technology.

5. A method as claimed in claim 1, wherein the ordered list of network call controllers in the first layer are part of the same call.

6. A method as claimed in claim 1, wherein successive network call controllers at the boundary of SCNs form sets of network call controllers and wherein sets of network call controllers in a first layer are associated with boundary network call controllers in said second layer.

7. A method as claimed in claim 6, wherein each of said sets of network call controllers in the first layer form the constituents of said ordered list.

8. A method as claimed in claim 6, wherein step (a) comprises establishing call segments between successive network call controllers in said second layer, and wherein step (b)(i) comprises adding a set of network call controllers in said first layer to said ordered list for each call segment spanning a mapped boundary network call controller in said second layer.

9. A method as claimed in claim 8, wherein an additional call controller in the second layer that continues the chain of call segments in the second layer, has its associated set of call controllers in the first layer added to the ordered set.

10. A method as claimed in claim 6, wherein at least some of the associations between sets of network controllers in said first layer and boundary network controllers in said second layer are provisioned in advance.

11. The method as claimed in claim 1, wherein the ordered list of network call controllers is determined from a network whose nodes comprise network call controllers and whose links represent the capability for network call controller to network call controller communication via a signaling communication network.

12. The method as claimed in claim 1, wherein the step of Establishing a call comprises re-using existing call segments of a second layer call.

13. The method as claimed in claim 12 wherein said generating step comprises adding associated sets of network call controllers in said first layer to said ordered list for each reused call segment that spans a mapped boundary network call controller in said second layer.

14. A method of call set up between first and second network call controllers in a first layer comprising:
   a) Establishing a call between said first and second network call controllers via a plurality of network call controllers in a second layer: and
   b) Generating an ordered list of network call controllers in said first layer which provide a signaling path between said first and second network controllers:
   that further comprises establishing a call between said plurality of network call controllers in said second layer and wherein said generating step comprises:
   generating said ordered list of first layer network controllers at said second layer in response to said establishing step by using information about intermediate first layer network call controllers provided by associations of pairs of first and second layer network call controllers; and
   communicating said ordered list to said first network controller.

15. The method as claimed in claim 14 further comprising establishing a call in said first layer via signaling between said ordered list of network call controllers.

16. The method as claimed in claim 15 wherein said signaling occurs via Signaling Control Networks between successive network call controllers.

17. The method as claimed in claim 14 further comprising removing repeated sections from said ordered list in order to avoid loops.

18. The method as claimed in claim 14 wherein one or more of said intermediate first layer network call controllers is a reduced function network call controller which provides signaling control without controlling a bearer plane in said first layer.

19. The method as claimed in claim 14 wherein said are multiple layers, with one layer acting as a server layer to a client layer above it, and also acting as a client layer to a server layer below it.

20. A non-transitory computer program product containing computer instructions stored in a machine readable medium, which when executed by a processor, instructs a network to set up a call between first and second network call controllers in a first layer comprising:
   a) instructions for establishing a call between said first and second network call controllers via a plurality of network call controllers in a second layer;
   b) instructions for generating an ordered list of network call controllers in said first layer which provide a signaling path between said first and second network controllers which include:
      i) instructions for generating an ordered list of first layer network call controllers at said second layer in response to establishing said call; and
      ii) instructions for communicating said ordered list to aid first network call controller for establishing signaling between said first and second network call controllers in said first layer;
   wherein hops in said signaling path can cross different signaling control networks (SCNs) and
   wherein said ordered list of network call controllers in said first layer are associated with said plurality of network call controllers in said second layer by means of associations between at least 2 pairs of call controllers, where each pair consists of a call controller from the first layer and one from the second layer.

* * * * *